No. 878,311. PATENTED FEB. 4, 1908.
J. H. PHILIPP.
FLAX HARVESTER.
APPLICATION FILED MAR. 8, 1907.
2 SHEETS—SHEET 1.
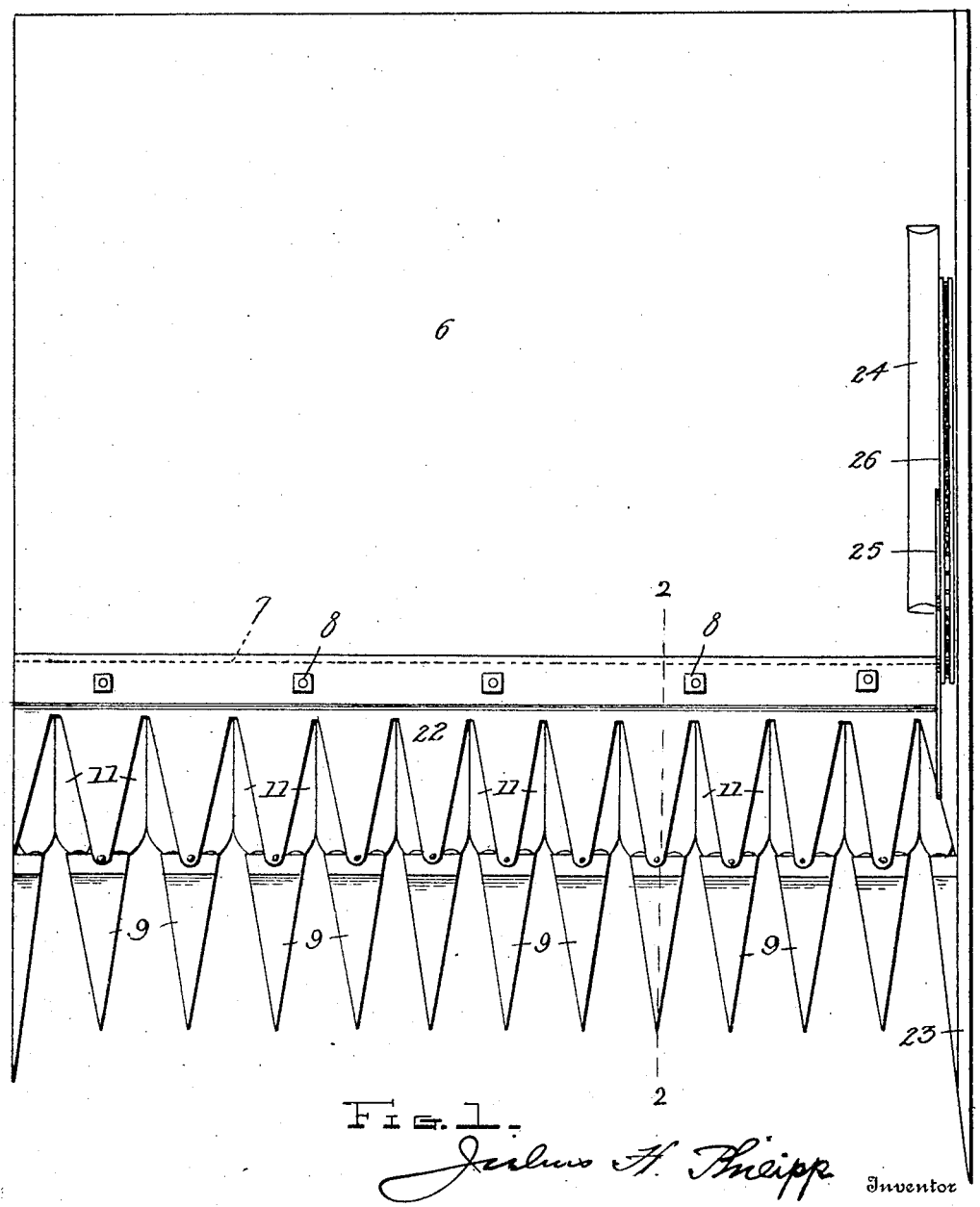

No. 878,311. PATENTED FEB. 4, 1908.
J. H. PHILIPP.
FLAX HARVESTER.
APPLICATION FILED MAR. 8, 1907.
2 SHEETS—SHEET 2.
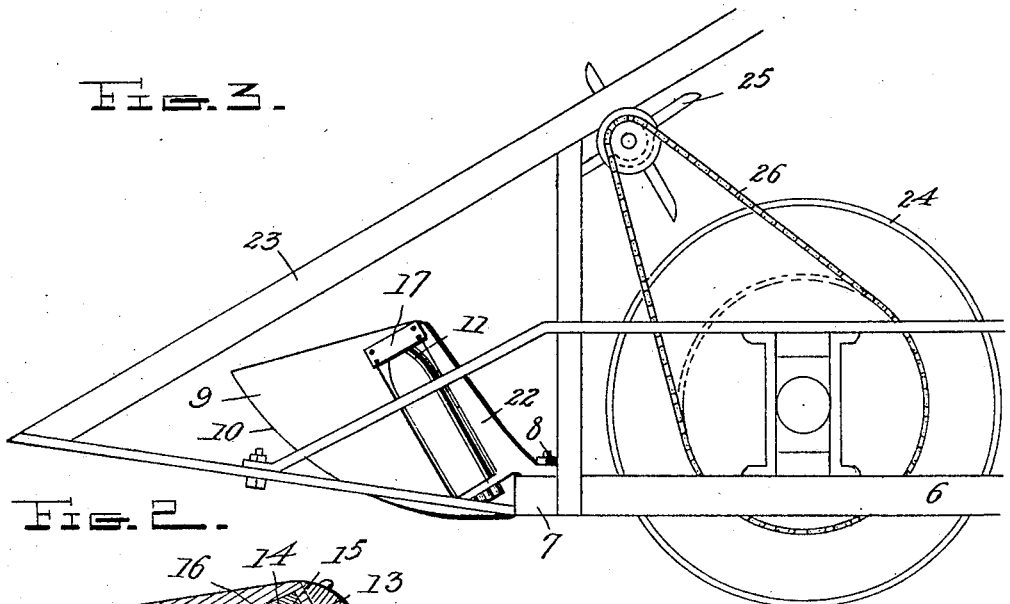
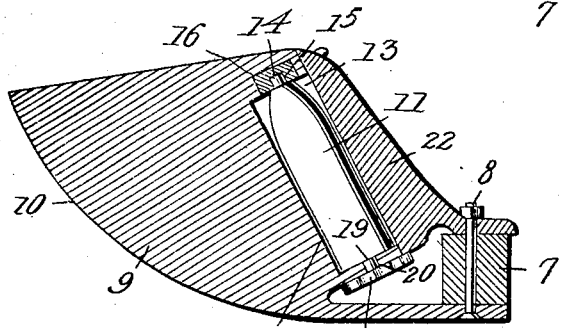
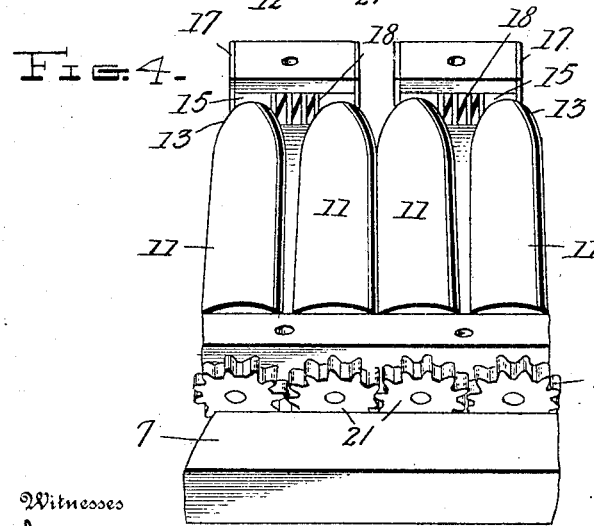
Julius H. Philipp,
Inventor
Witnesses
By
Attorneys

UNITED STATES PATENT OFFICE.

JULIUS H. PHILIPP, OF PORT HURON, MICHIGAN, ASSIGNOR OF ONE-HALF TO CHARLES F. GARAGHTY, OF DETROIT, MICHIGAN.

FLAX-HARVESTER.

No. 878,311.    Specification of Letters Patent.    Patented Feb. 4, 1908.

Application filed March 8, 1907. Serial No. 361,240.

*To all whom it may concern:*

Be it known that I, JULIUS H. PHILIPP, a citizen of the United States, residing at Port Huron, in the county of St. Clair and State of Michigan, have invented certain new and useful Improvements in Flax-Harvesters, of which the following is a specification.

This invention relates to flax harvesters or pullers, and has for its object to provide improved means for pulling the flax, said means comprising, speaking generally, a series of pairs of rollers geared together and carried at the front end of the platform, the rollers of each pair working in opposite directions, and the platform being provided with guards in front of the rollers which direct the flax between the same, where it is caught and pulled.

The invention is illustrated in the accompanying drawings, in which

Figure 1 is a top plan view. Fig. 2 is a vertical section on the line 2—2 of Fig. 1. Fig. 3 is an end elevation of the outer end of the platform, showing the divider. Fig. 4 is a detail in rear elevation.

Referring specifically to the drawings, 6 indicates the platform, the front sill of which is indicated at 7. Secured by bolts 8 to the front sill are the guards or fingers 9 which project forwardly therefrom and taper to a point at the front, the lower edge being curved upwardly as at 10 to travel readily over the ground and through the flax. The guards are of considerable height or depth, so that the points thereof are several inches above the ground, and at the rear ends the guards are of considerable width, to afford bearing spaces for the rollers to be hereinafter described. The sides of the guards are properly curved or inclined to gather the flax stalks therebetween and guide the same to the pulling rollers. These rollers, 11, are set in recesses 12 in the rear side of the guards, at an angle of about forty-five or fifty degrees from the horizontal. Each guard carries or accommodates two rollers. The front ends of the rollers are tapered off, as at 13, to allow the flax to enter therebetween, and the rollers have pivots 14 at the front ends thereof which work in bearing boxes 15 which are held in undercut recesses 16 at the upper end of the recesses 12. The boxes 15 are slidable sidewise in the recesses 16 and are held therein by plates 17 at the ends of the recesses. A spring 18 is placed in compression between the boxes in each recess, and allows the rollers to yield according to the nature or amount of stalks which enter therebetween.

It will be observed that one roller of each pair is carried by one guard, and the coöperating roller is carried by the next adjacent guard, so that stalks entering between the guards are acted upon by said pair, the respective rollers revolving in opposite directions.

The spindles 19 at the rear ends of the rollers extend through bearing slots 20 in the rear or lower part of the guards, and are provided with gears 21, which are located in the space between the guards and the front sill of the platform, and which mesh with each other to cause the rollers of the respective pairs to revolve in opposite directions. The gears have deep teeth, so that the rollers may yield laterally to a sufficient extent, without disengaging the gears. Cap pieces 22 are bolted to the top of the sill 7, and to the upper edge of the guards, and serve to cover the gearing. The gears are driven from the main driving devices of the machine, in any suitable manner. At the outer edge of the platform is a divider 23, which serves a well-known purpose, and is supported by a wheel 24. Owing to the close growth of flax it is advisable that means be provided to prevent clogging or entanglement of the divider, and said means consists of a rotary cutter 25 having a series of knives which work closely beside the divider board and serve to cut the tops of the flax and to form a clear way for the divider as it passes therethrough. The cutter is driven by a chain belt 26 from the wheel 24.

As the machine travels the flax is guided by means of the guards 9 between the rollers 11, which, owing to their rotation and the angle at which they are set, engage and pull the stalks of flax and deposit the same on the platform. The angle at which the rollers are set causes them to run down the stalks with gradually increasing pull and also to clear themselves by delivering the product backwardly onto the platform.

I claim:

In a flax harvester, in combination, a platform, a sill at the front thereof, guards secured to the under side of the sill and projecting forwardly therefrom and having lower edges curved upwardly at the front, and also having recesses in the rear side, said recesses being undercut in the guards at the top, a series of pairs of pulling rollers set in said recesses and having bearing boxes at the upper end slidable laterally in the said undercut part of the recesses, gears between the rollers at the lower end thereof, and cap pieces secured to the top of the sill and to the upper edge of the guards, over said gears.

In testimony whereof I affix my signature, in presence of two witnesses.

JULIUS H. PHILIPP.

Witnesses:
H. A. MAITLAND,
S. McFARLAND.